United States Patent
Xu et al.

(10) Patent No.: US 9,892,633 B2
(45) Date of Patent: Feb. 13, 2018

(54) REFLECTION INTERFERENCE CONTROL

(71) Applicant: Beijing Zhigu Rui Tuo Tech Co., Ltd, Beijing (CN)

(72) Inventors: Ran Xu, Beijing (CN); Wei Shi, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 0 days.

(21) Appl. No.: 15/316,513

(22) PCT Filed: Apr. 30, 2015

(86) PCT No.: PCT/CN2015/077972
§ 371 (c)(1),
(2) Date: Dec. 5, 2016

(87) PCT Pub. No.: WO2015/184943
PCT Pub. Date: Dec. 10, 2015

(65) Prior Publication Data
US 2017/0162039 A1   Jun. 8, 2017

(30) Foreign Application Priority Data

Jun. 6, 2014  (CN) .......................... 2014 1 0251087

(51) Int. Cl.
*H04B 10/079*  (2013.01)
*H04B 10/116*  (2013.01)
*G08C 23/04*  (2006.01)

(52) U.S. Cl.
CPC ......... *G08C 23/04* (2013.01); *H04B 10/0795* (2013.01); *H04B 10/116* (2013.01)

(58) Field of Classification Search
CPC ... G08C 23/04; H04B 10/0795; H04B 10/116
(Continued)

(56) References Cited

U.S. PATENT DOCUMENTS 8,107,825 B2 * 1/2012 Rajagopal .......... H04B 10/1149
                                                       398/172
2011/0074782 A1   3/2011 Hirotani et al.
(Continued)

FOREIGN PATENT DOCUMENTS

CN      102096916        6/2011
CN      102696069 A      9/2012
(Continued)

OTHER PUBLICATIONS

International Search Report for PCT Application No. PCT/CN2015/077972, dated Aug. 5, 2015, 4 pages.

*Primary Examiner* — Dalzid Singh
(74) *Attorney, Agent, or Firm* — Amin, Turocy & Watson, LLP

(57) ABSTRACT

Reflection interference control can comprise: determining, according to identification information comprised in a light signal from a reflection surface to a field of view of a user, that a reflection interference phenomenon exists on the reflection surface; and generating a control signal for lowering the level of the reflection interference. For example, by using the characteristic that a light source identifier is modulated in a light signal transmitted by a light source in the existing wireless optical communication, whether a reflection interference phenomenon exists can be determined according to identification information comprised in a light signal received by a field of view of a user from a reflection surface, and reflection interference is automatically controlled if it is determined that the reflection interference phenomenon exists, which is simple and quick and does not require user intervention.

41 Claims, 5 Drawing Sheets

(58) Field of Classification Search
USPC .......................................................... 398/116
See application file for complete search history.

(56) References Cited

U.S. PATENT DOCUMENTS

| | | | |
|---|---|---|---|
| 2012/0224860 A1* | 9/2012 | Kim | H04B 10/1149 398/128 |
| 2012/0229487 A1 | 9/2012 | Samanta et al. | |
| 2013/0027371 A1* | 1/2013 | Saitoh | H04N 9/643 345/207 |
| 2015/0234217 A1* | 8/2015 | Aoyama | G02F 1/13306 349/33 |
| 2016/0087719 A1* | 3/2016 | Baggen | H04B 10/116 398/120 |

FOREIGN PATENT DOCUMENTS

| | | |
|---|---|---|
| CN | 103518156 A | 1/2014 |
| CN | 104050799 A | 9/2014 |
| JP | H0713784 A | 1/1995 |

* cited by examiner

REFLECTION INTERFERENCE CONTROL

RELATED APPLICATION

The present application is a U.S. National Stage filing under 35 U.S.C. § 371 of international patent cooperation treaty (PCT) application No. PCT/CN2015/077972, filed Apr. 30, 2015, and entitled "REFLECTION INTERFERENCE CONTROL", which claims priority to Chinese Patent Application No. 201410251087.X, filed on Jun. 6, 2014, which applications are hereby incorporated herein into the present application by reference in their respective entireties.

TECHNICAL FIELD

The present application relates to the technical field of wireless optical communications, and, for example, to a reflection interference control method and apparatus.

BACKGROUND

When watching visual content (for example, reading, watching video content, or looking into a mirror), a user often experiences interference from light signals sent by other light sources in the environment where the user is located. For example, in a scenario shown in FIG. 1, when a user watches content displayed on a display screen of a terminal device (such as a mobile phone, a portable computer, or a television, etc.) 110, light emitted by a light source 120 is reflected from the surface of the display screen of the device 110 to the field of view of the user. When the strength of the light signal of the light source 120 reaches a certain level, the user watching the content experiences the interference.

SUMMARY

An example, non-limiting objective of the present application is to provide a solution for reducing reflection interference.

To these and/or related ends, in a first example aspect, an embodiment of the present application provides a reflection interference control method, wherein the method comprises:

determining, according to identification information comprised in a light signal from a reflection surface to a field of view of a user, that a reflection interference phenomenon exists on the reflection surface; and generating a control signal for lowering the level of the reflection interference, wherein the reflection surface is a surface for displaying target content, and the reflection interference phenomenon is that: the light signal from the reflection surface to the field of view of the user comprises a desired signal and a reflection interference signal, wherein the desired signal is a light signal required for displaying the target content, and the reflection interference signal is a light signal that is transmitted by a light source other than a light source of the desired signal and is reflected from the reflection surface to the field of view of the user.

In a second example aspect, an embodiment of the present application provides a reflection interference control apparatus, wherein the apparatus comprises:

a first determining module, configured to determine, according to identification information comprised in a light signal from a reflection surface to a field of view of a user, that a reflection interference phenomenon exists on the reflection surface; and a first control module, configured to generate a control signal for lowering the level of the reflection interference, wherein the reflection surface is a surface for displaying target content, and the reflection interference phenomenon is that: the light signal from the reflection surface to the field of view of the user comprises a desired signal and a reflection interference signal, wherein the desired signal is a light signal required for displaying the target content, and the reflection interference signal is a light signal that is transmitted by a light source other than a light source of the desired signal and is reflected from the reflection surface to the field of view of the user.

In a third example aspect, an embodiment of the present application provides a head-mounted device, wherein the device comprises the apparatus according to the second aspect.

In a fourth example aspect, an embodiment of the present application provides a computer readable storage device, comprising at least one executable instruction, which, in response to execution, causes a system comprising a processor to perform operations, comprising:

determining, according to identification information comprised in a light signal from a reflection surface to a field of view of a user, that a reflection interference phenomenon exists on the reflection surface; and generating a control signal for lowering the level of the reflection interference, wherein the reflection surface is a surface for displaying target content, and the reflection interference phenomenon is that: the light signal from the reflection surface to the field of view of the user comprises a desired signal and a reflection interference signal, wherein the desired signal is a light signal required for displaying the target content, and the reflection interference signal is a light signal that is transmitted by a light source other than a light source of the desired signal and is reflected from the reflection surface to the field of view of the user.

In a fifth example aspect, an embodiment of the present application provides a device for reflection interference control, comprising a processor and a memory, wherein the memory storing a computer executable instruction, the processor being connected with the memory via a communication bus, and when the device is operating, the processor executes or facilitates execution of the executable instructions stored by the memory to cause the device to perform operations, comprising:

determining, according to identification information comprised in a light signal from a reflection surface to a field of view of a user, that a reflection interference phenomenon exists on the reflection surface; and generating a control signal for lowering the level of the reflection interference, wherein the reflection surface is a surface for displaying target content, and the reflection interference phenomenon is that: the light signal from the reflection surface to the field of view of the user comprises a desired signal and a reflection interference signal, wherein the desired signal is a light signal required for displaying the target content, and the reflection interference signal is a light signal that is transmitted by a light source other than a light source of the desired signal and is reflected from the reflection surface to the field of view of the user.

According to example methods and the apparatuses of the embodiments of the present application, by using the characteristic that a light source identifier is modulated in a light signal transmitted by a light source in the existing wireless optical communication, whether a reflection interference phenomenon exists can be determined according to identification information comprised in a light signal received by a field of view of a user from a reflection surface, and reflection interference is automatically controlled if it is determined that the reflection interference phenomenon exists, which is simple and quick and does not require user intervention.

DETAILED DESCRIPTION

Figure 1:
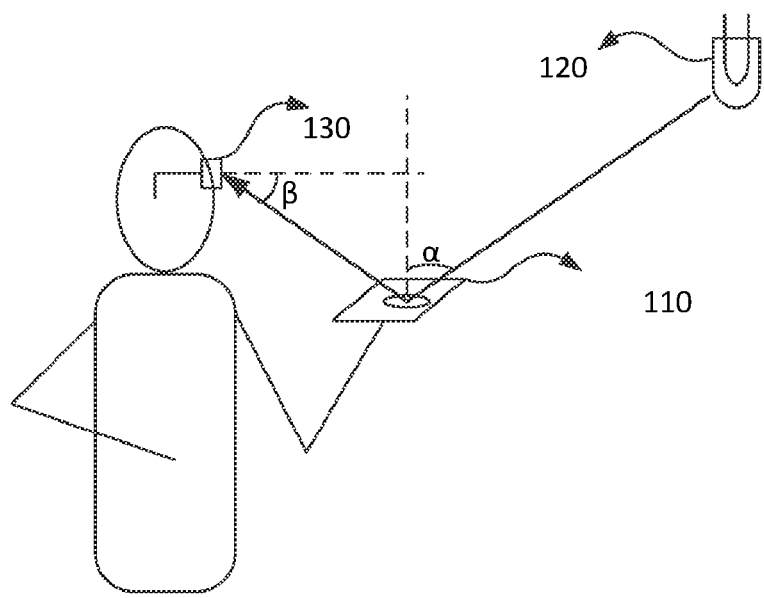
FIG. 1 is an example schematic diagram of a reflection interference scenario.

Example embodiments of the present application are further described below in detail with reference to the accompanying drawings (in which like elements are denoted by like reference numerals) and embodiments. The following embodiments are used for describing the present application, but are not intended to limit the scope of the present application.

A person skilled in the art may understand that the terms such as "first" and "second" in the present application are used only to differentiate different steps, devices, modules, or the like, and neither represent any specific technical meaning, nor indicate any logical relationship between the terms.

Figure 2A:
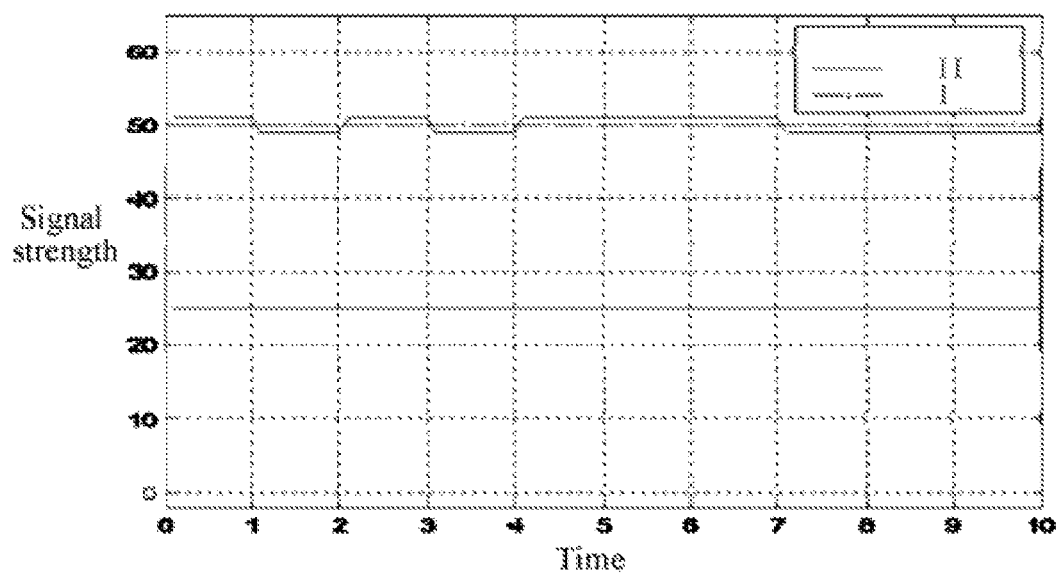
FIG. 2(a) is an example schematic diagram of the strength of a light signal before reflection interference is controlled.

To make the present application more comprehensible, the following description is provided: In the embodiments of the present application, a "reflection surface" is a surface for displaying target content that a user wants to see, especially a surface with specular reflection, such as a mirror surface, a paper surface, or a display screen surface of any device (for example, a mobile phone, a computer, a television, or a wearable device (such as a wrist band)) having a display screen. A "desired signal" is a light signal required for displaying the target content, for example, for a mirror surface or a paper surface, the desired signal is a light signal required for displaying, on a mirror, the target content that a user wants to see, and in this case, the light signal is generally transmitted by a light source outside the mirror or a paper product. For any device having a display screen, the desired signal may be a light signal sent by a back light source of the display screen when content is displayed on the display screen of the device. The light source of the desired signal may be a natural light source, or may be a particular artificial light source, for example, a particular lighting/decorative light source, or the back light source of the display screen. A "reflection interference signal" is a light signal that is transmitted by a light source other than the light source of the desired signal and is reflected from the reflection surface to a field of view of a user. The light source of the reflection interference signal is generally any lighting/decorative light source in an environment where the reflection surface is located. In the embodiments of the present application, the light signal sent by the light source of the reflection interference signal comprises a unique identifier (such as a MAC address) of the light source of the reflection interference signal, and such a light source can be used for high-speed data communication (wireless optical communication), for example, used as a light source in visible light communication (VLC): a white light emitting diode (LED). In addition, when the strength of the reflection interference signal is close to or even greater than the strength of the desired signal, a user watching the target content experiences the interference. However, when the reflection interference signal is obviously greater than the strength of the desired signal, identification information comprised in the reflection interference signal can be obtained through demodulation. By still using the scenario shown in FIG. 1 as an example, FIG. 2(a) is a schematic diagram of the strength of light signals sent by a light source 120 and a back light source of a device 110, where a straight dashed line represents the strength of a light signal I that is transmitted by the light source 120 and is reflected from a display screen surface (a reflection surface) of the device 110 to a field of view of a user, and an ID of the light source 120 is modulated on the light signal I, which is shown by using a rectangular wave on the straight dashed line in FIG. 2(a); a straight solid line represents the strength of a light signal II transmitted from the back light source of the device 110 to the field of view of the user, and in this case, the ID of the light source 120 that is modulated on the light signal I can be obtained by demodulating the light signal from the display screen surface to the field of view of the user.

Figure 3:
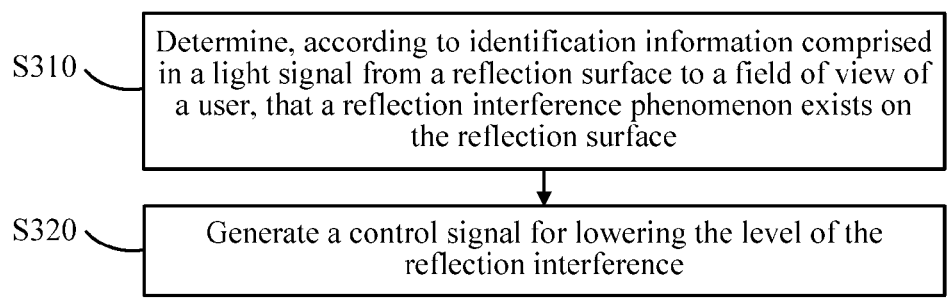
FIG. 3 is an example flowchart of a reflection interference control method according to an embodiment of the present application.

Based on the foregoing description, as shown in FIG. 3, a reflection interference control method according to an embodiment of the present application comprises:

S310: Determine, according to identification information comprised in a light signal from a reflection surface to a field of view of a user, that a reflection interference phenomenon exists on the reflection surface.

Generally, reflection interference is interference that a user experiences when watching target content, and a reflection interference signal is relative to a desired signal entering the field of view of the user. Therefore, the method according to this embodiment of the present application may be performed by using such an apparatus: the apparatus can acquire a light signal transmitted from a reflection surface to a field of view of a user. Whether the light signal from the reflection surface to the field of view of the user comprises a reflection interference signal having certain strength can be determined according to the identification information comprised in the light signal entering the field of view of the user, so as to determine whether a reflection interference phenomenon exists on the reflection surface.

S320: Generate a control signal for lowering the level of the reflection interference.

According to the method in this embodiment of the present application, by using the characteristic that a light source identifier is modulated in a light signal transmitted by a light source in the existing wireless optical communication, whether a reflection interference phenomenon exists can be determined according to identification information comprised in a light signal received by a field of view of a user from a reflection surface, and reflection interference is automatically controlled if it is determined that the reflection interference phenomenon exists, which is simple and quick and does not require user intervention.

In order to determine whether the reflection interference phenomenon exists, so as to control reflection interference, the method according to this embodiment of the present application further comprises:

S330: Demodulate the light signal from the reflection surface. Demodulating a light signal to obtain information is a mature technology in the art, and is not intended to limit this embodiment of the present application herein. Moreover, preferably, step S330 is performed before step S310 and step S320 are performed, and step S330 is still performed in real time and continuously after step S320 is performed.

When the strength of the reflection interference signal is greater than that of the desired signal, the identification information comprised in the reflection interference signal can be obtained by demodulating the light signal from the reflection surface to the field of view of the user. Therefore, when step S330 is performed before step S310 and step S320, it is possible that no identification information can be obtained through demodulation, and in this case, it may be determined in step S310 that no reflection interference phenomenon exists on the reflection surface, and step S320 is not performed. Alternatively, at least one piece of identification information may be obtained through demodulation, and in this case, step S310 is performed. In step S310, whether the reflection interference phenomenon exists on the reflection surface may be determined according to the at least one piece of identification information. Specifically:

In an example embodiment, a preset identifier of at least one light source other than the light source of the desired signal may be set, that is, an identifier of at least one light source of the reflection interference signal is known, and once such a preset identifier is obtained through demodulation, it may be determined that the reflection interference signal is received. In step S310, it is determined, in response to that the at least one piece of identification information obtained through demodulation in step S330 comprises at least one preset identifier, that the reflection interference phenomenon exists on the reflection surface.

In another example embodiment, a preset identifier of a light source of the desired signal may be set, and in step S310, it is determined, in response to that the at least one piece of identification information obtained through demodulation in step S330 comprises an identifier other than the preset identifier, that the reflection interference phenomenon exists on the reflection surface.

Because there may be one or more light sources causing reflection interference, some or all of the light sources that are controllable can be controlled by using the method according to this embodiment of the present application. Correspondingly, the method according to this embodiment of the present application further comprises a step of determining at least one target reflection interference signal to be controlled. In the example embodiment in which a preset identifier of at least one light source other than the light source of the desired signal is set, a light signal corresponding to at least one of the at least one preset identifier is determined as a target reflection interference signal, and preferably, light signals corresponding to all identifiers in the at least one preset identifier are determined as target reflection interference signals. In the example embodiment in which a preset identifier of a light source of the desired signal is set, a light signal corresponding to at least one of the at least one identifier other than the preset identifier is determined as a target reflection interference signal, and preferably, light signals corresponding to all identifiers in the at least one identifiers other than the preset identifier are determined as target reflection interference signals.

In addition, according to different manners in which the light source can be controlled, in step S320, a control signal for lowering the level of the reflection interference in multiple manners may be generated. For example, in an example embodiment, the luminance of the light source of the desired signal can be controlled, and in this case, such a control signal may be generated in step S320: the control signal is used for lowering the level of the reflection interference by increasing the luminance of the light source of the desired signal. In another example embodiment, the light source corresponding to the target reflection interference signal can be controlled, and in this case, such a control signal may be generated in step S320: the control signal is used for lowering the level of the reflection interference by decreasing the luminance of the light source corresponding to the target reflection interference signal. In still another example embodiment, not only the luminance of the light source of the desired signal can be controlled, but also the luminance of the light source corresponding to the target reflection interference signal can be controlled, and in this case, such a control signal may be generated in step S320: the control signal is used for lowering the level of the reflection interference by increasing the luminance of the light source of the desired signal and decreasing the luminance of the light source corresponding to the target reflection interference signal. In yet another example embodiment, the light source corresponding to the target reflection interference signal can be controlled, and in this case, such a control signal may be generated in step S320: the control signal is used for changing a possible propagation path of the light signal by adjusting an orientation of the light source corresponding to the target reflection interference signal, so that the light signal will not be reflected to the field of view of the user, or only a small part of the light signal will be reflected to the field of view of the user, so as to lower the level of the reflection interference.

In addition, in the example embodiment in which the control is implemented by adjusting the luminance of the light source, the luminance of the light source may be increased/decreased by an appropriate value as required. Moreover, step S320 is a continuously performed process, and step S320 is not stopped until the control performed on the target reflection interference signal meets stop conditions described below.

After the control signal is generated, the method according to this embodiment of the present application further comprises:

S340: Send the control signal.

According to different control manners of the control signal and different manners and degrees in which and by which the light source can be controlled, the sending manner in step S340 may also vary. Specifically:

In an example embodiment, the control signal needs to control the light source corresponding to the target reflection interference signal, and in this case, in step S340, the control signal is sent in such a manner that the light source of the target reflection interference signal can receive the control signal. The manner of sending the control signal may be wired or wireless. The wireless manners comprise WiFi, Bluetooth, and the like, and if hardware conditions permit, may also comprise a manner of sending the control signal to the light source of the target reflection interference signal in the form of a light signal along an incident light path of the target reflection interference signal. By still using the scenario shown in FIG. 1 as an example, it is detected that the light signal transmitted by the light source 120 is reflected from the display screen surface at a reflection angle α and the light signal enters the field of view of the user at an incident angle β. After the two angles are determined, a light path of the light signal transmitted by the light source 120 to the field of view of the user can be determined, and the control signal is returned to the light source 120 along the light path.

It should be noted that, the light source of the target reflection interference signal may not be an intelligent light source that can implement self-control, and in this case, the control signal may be sent to a control device of the light source of the target reflection interference signal.

In another example embodiment, the control signal needs to control the light source of the desired signal, and in this case, in step S340, the control signal is sent in such a manner that the light source of the desired signal or the control device of the light source of the desired signal can receive the control signal. A specific sending manner is similar to that described above about the target reflection interference signal.

Figure 2B:
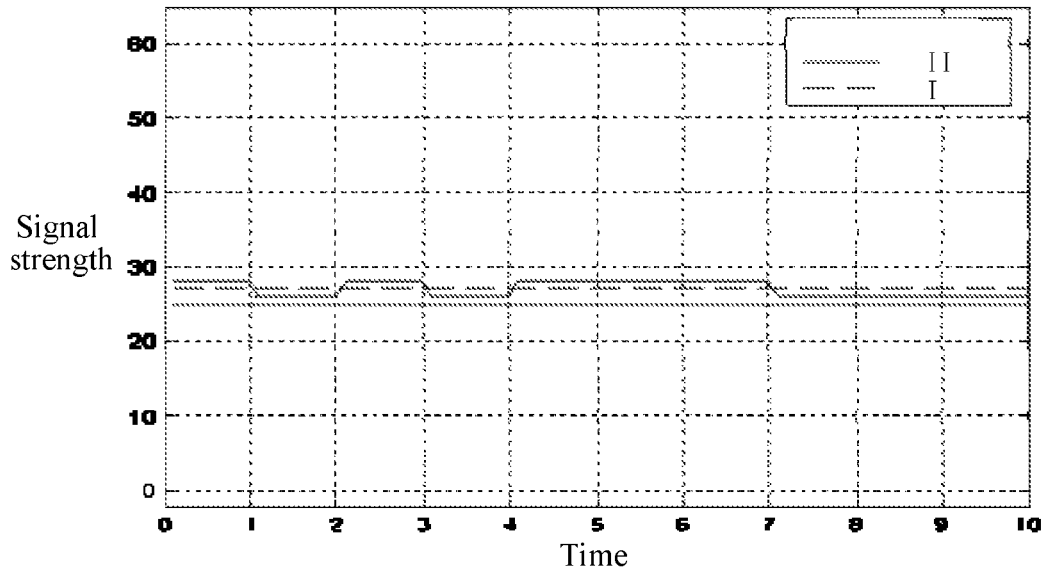
FIG. 2(b) is an example schematic diagram when the strength of a reflection interference signal is close to the strength of a desired signal in a process of controlling reflection interference.

In a process of controlling the reflection interference phenomenon, at a moment, the strength of the reflection interference signal is close to the strength of the desired signal (lower interference limit) (as shown in FIG. 2(b)), and in step S330, it is very difficult to obtain the identification information comprised in the target reflection interference signal through demodulation. In this case, it may be considered that the strength of the reflection interference signal is approximately equal to the strength of the desired signal. In other words, by increasing the strength of the desired signal and/or decreasing the strength of the target reflection interference signal, the strength of the desired signal and the strength of the target reflection interference signal become closer to each other, and when the strength of the desired signal and the strength of the target reflection interference signal are almost equal, the identifier of the target reflection interference signal cannot be obtained through demodulation. In view of this, in the example embodiment in which light signals corresponding to some identifiers in the at least one preset identifier are determined as target reflection interference signals, the method according to this embodiment of the present application further comprises the following step:

S350: Determine the strength of a desired signal in response to that the at least one piece of identification information obtained through demodulation in step S330 does not comprise an identifier corresponding to the target reflection interference signal.

In the example embodiment in which light signals corresponding to some identifiers in the at least one preset identifier are determined as target reflection interference signals, in a process of controlling the reflection interference phenomenon, when the strength of the reflection interference signal is close to the strength of the desired signal at a moment, it is very difficult to obtain any identification information through demodulation in step S330. In view of this, the method according to this embodiment of the present application further comprises the following step:

S350': Determine the strength of the desired signal in response to that no identification information is obtained through demodulation in step S330.

No matter which one of the above example embodiments is used, a manner for determining the strength of the desired signal may be that, for example, assuming that the detected strength of the light signal from the reflection surface is I, the strength of the desired signal is I/2. The strength of the desired signal may be used for stopping controlling the reflection interference as described below.

Even if the strength of the reflection interference signal is close to the strength of the desired signal, the reflection interference phenomenon still exists, and therefore, after the strength of the desired signal is determined, step S320 is continuously performed. If the strength of the reflection interference signal is obviously smaller than that of the desired signal, no reflection interference phenomenon exists, and the above control signal may not be generated any longer. In the method according to this embodiment of the present application, whether to stop generation of the control signal in step S320 is determined according to whether a difference between the strength of the desired signal and the strength of the target reflection interference signal is in a preset range. The preset range may be set according to experience. Correspondingly, after step S350 or S350', the method according to this embodiment of the present application further comprises:

S360: Stop generating the control signal in response to that a difference between the strength of the desired signal and the strength of the reflection interference signal is in a preset range. Moreover, the step further comprises:

S361: Determine the difference according to the strength of the desired signal and the strength of the light signal from the reflection surface to the field of view of the user.

When the at least one piece of identification information does not comprise the identifier corresponding to the target reflection interference signal, reflection interference control is continuously performed, and the difference I-I' may be monitored in real time since then, where I' is the strength, which is acquired at a current moment, of the light signal from the reflection surface to the field of view of the user.

S362: Stop generating the control signal in response to that the difference is in the preset range. For example, when the difference exceeds a threshold suitable for watching of the user, it indicates that the desired signal is greater than the reflection interference signal by such a degree that the user will not perceive the existence of the reflection interference signal, and in this case, generation of the control signal can be stopped.

To sum up, the method according to this embodiment of the present application can automatically properly adjust the reflection interference phenomenon, so as to provide good user experience.

A person skilled in the art may understand that in the foregoing methods of the example embodiments of the present application, the value of the serial number of each step does not mean an execution sequence, and the execution sequence of each step should be determined according to the function and internal logic thereof, and should not be any limitation on the implementation procedure of the example embodiments of the present application.

Figure 4:
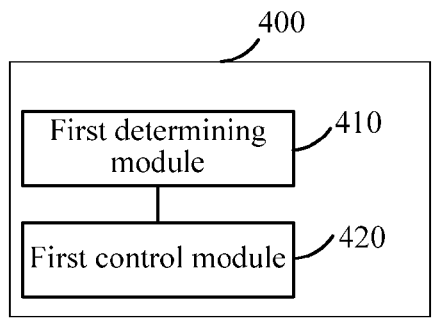
FIG. 4 is an example structural block diagram of a reflection interference control apparatus according to a first embodiment of the present application.

The present application further provides a reflection interference control apparatus for performing the foregoing method embodiments. The apparatus is such an apparatus that can acquire a light signal sent from a reflection surface to a field of view of a user. As shown in FIG. 4, a reflection interference control apparatus 400 according to a first embodiment of the present application comprises a first determining module 410 and a first control module 420.

The first determining module 410 is configured to determine, according to identification information comprised in a light signal from a reflection surface to a field of view of a user, that a reflection interference phenomenon exists on the reflection surface.

The apparatus 400 in this embodiment may acquire, by using a photosensitive element comprised in the apparatus 400 or an external photosensitive element, the light signal entering the field of view of the user. The first determining module 410 can determine, according to the identification information comprised in the light signal, whether the light signal from the reflection surface to the field of view of the user comprises a reflection interference signal having certain strength, so as to determine whether a reflection interference phenomenon exists on the reflection surface.

The first control module 420 is configured to generate a control signal for lowering the level of the reflection interference. After the first determining module 410 determines that the reflection interference phenomenon exists, the first control module 420 controls the reflection interference by using a control signal.

According to the apparatus in this embodiment of the present application, by using the characteristic that a light source identifier is modulated in a light signal transmitted by a light source in the existing wireless optical communication, whether a reflection interference phenomenon exists can be determined according to identification information comprised in a light signal received by a field of view of a user from a reflection surface, and reflection interference is automatically controlled if it is determined that the reflection interference phenomenon exists, which is simple and quick and does not require user intervention.

Figure 5:
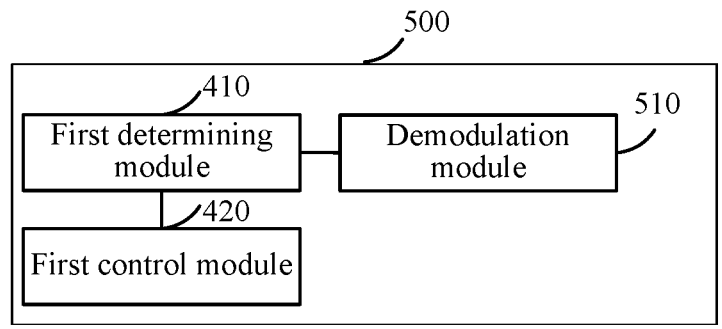
FIG. 5 is an example structural block diagram of a reflection interference control apparatus according to a second embodiment of the present application.

In order to determine whether the reflection interference phenomenon exists, so as to control reflection interference, as shown in FIG. 5, an apparatus 500 according to a second embodiment of the present application further comprises a demodulation module 510.

The demodulation module 510 is configured to demodulate the light signal from the reflection surface to the field of view of the user. Demodulating a light signal to obtain information is a mature technology in the art, and is not intended to limit this embodiment of the present application herein. Moreover, preferably, the demodulation module 510 performs demodulation before the first determining module 410 and the first control module 420 perform their functions, and after the first control module 420 starts to perform control, the demodulation function of the demodulation module 510 is performed in real time and continuously. In addition, the demodulation module 510 and the foregoing photosensitive element may be integrated into a receiving end device in visible light communication.

When the strength of the reflection interference signal is greater than that of the desired signal, the identification information comprised in the reflection interference signal can be obtained by demodulating the light signal from the reflection surface to the field of view of the user. Therefore, before the first determining module 410 and the first control module 420 perform their functions, it is possible that no identification information is obtained through demodulation by the demodulation module 510, and in this case, the first determining module 410 may determine that no reflection interference phenomenon exists on the reflection surface, and the first control module 420 is not triggered to perform its function. Alternatively, the demodulation module 510 may obtain at least one piece of identification information through demodulation, and in this case, the first determining module 410 may determine, according to the at least one piece of identification information, whether the reflection interference phenomenon exists on the reflection surface. Specifically:

In an example embodiment, the apparatus according to the embodiments of the present application may store or may acquire a preset identifier of at least one light source other than the light source of the desired signal, that is, an identifier of at least one light source of the reflection interference signal is known. The first determining module 410 determines, in response to that the at least one piece of identification information obtained through demodulation by the demodulation module 510 comprises at least one preset identifier, that the reflection interference phenomenon exists on the reflection surface.

In another example embodiment, the apparatus according to the embodiments of the present application may store or may acquire a preset identifier of a light source of the desired signal, and the first determining module 410 determines, in response to that the at least one piece of identification information obtained through demodulation by the demodulation module 510 comprises an identifier other than the preset identifier, that the reflection interference phenomenon exists on the reflection surface.

Figure 6:
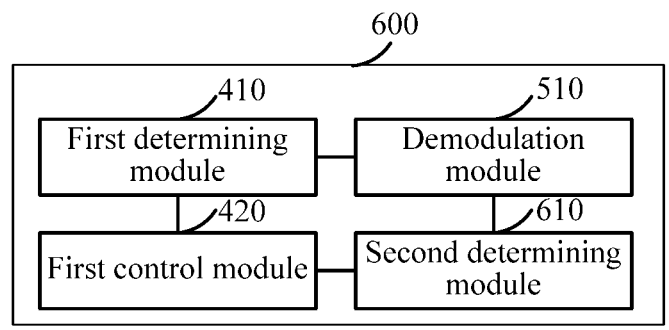
FIG. 6 is an example structural block diagram of a reflection interference control apparatus according to a third embodiment of the present application.

Because there may be one or more light sources causing reflection interference, some or all of the light sources that are controllable can be controlled by the apparatus according to this embodiment of the present application. Correspondingly, as shown in FIG. 6, an apparatus 600 according to a third embodiment of the present application may further comprise a second determining module 610.

The second determining module 610 is configured to determine a target reflection interference signal. In the example embodiment in which the first determining module 410 determines, in response to that the at least one piece of identification information obtained through demodulation by the demodulation module 510 comprises at least one preset identifier, that the reflection interference phenomenon exists on the reflection surface, the second determining module 610 may determine a light signal corresponding to at least one of the at least one preset identifier as a target reflection interference signal, and preferably, determine light signals corresponding to all identifiers in the at least one preset identifier as target reflection interference signals. In the example embodiment in which the first determining module 410 determines, in response to that the at least one piece of identification information obtained through demodulation by the demodulation module 510 comprises the identifier other than the preset identifier, that the reflection interference phenomenon exists on the reflection surface, the second determining module 610 may determine a light signal corresponding to at least one of the at least one identifier other than the preset identifier as a target reflection interference signal, and preferably, determine light signals corresponding to all identifiers in the at least one identifier other than the preset identifier as target reflection interference signals.

In addition, according to different manners in which the light source can be controlled, the first control module 420 may generate a control signal for lowering the level of the reflection interference in multiple manners. For example, in an example embodiment, the luminance of the light source of the desired signal can be controlled, and in this case, the first control module 420 may generate such a control signal: the control signal is used for lowering the level of the reflection interference by increasing the luminance of the light source of the desired signal. In another example embodiment, the light source corresponding to the target reflection interference signal can be controlled, and in this case, the first control module 420 may generate such a control signal: the control signal is used for lowering the level of the reflection interference by decreasing the luminance of the light source corresponding to the target reflection interference signal. In still another example embodiment, not only the luminance of the light source of the desired signal can be controlled, but also the luminance of the light source corresponding to the target reflection interference signal can be controlled, and in this case, the first control module 420 may generate such a control signal: the control signal is used for lowering the level of the reflection interference by increasing the luminance of the light source of the desired signal and decreasing the luminance of the light source corresponding to the target reflection interference signal. In yet another example embodiment, the light source corresponding to the target reflection interference signal can be controlled, and in this case, the first control module 420 may generate such a control signal: the control signal is used for changing a possible propagation path of the light signal by adjusting an orientation of the light source corresponding to the target reflection interference signal, so that the light signal will not be reflected to the field of view of the user, or only a small part of the light signal will be reflected to the field of view of the user, so as to lower the level of the reflection interference. The orientation of the light source may be adjusted by using a mechanical structure, and the structure may also be a part of the apparatus according to the embodiments of the present application.

In addition, the control signal generated by the first control module 420 may be used for increasing/decreasing the luminance of the light source by an appropriate value as required. Moreover, the function of the first control module 420 is performed continuously. The first control module 420 does not stop performing its function until the control performed on the target reflection interference signal meets stop conditions described below.

Figure 7:
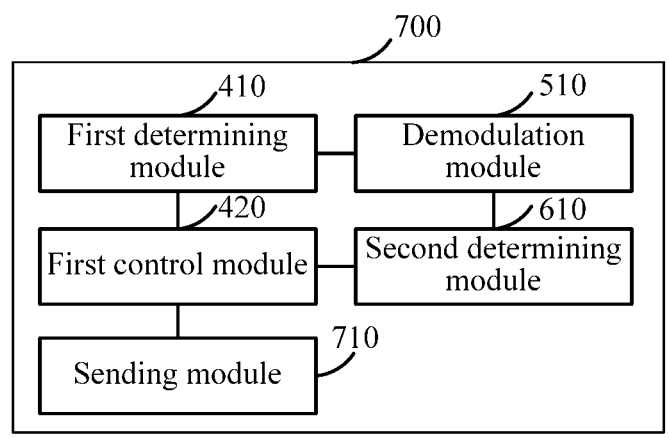
FIG. 7 is an example structural block diagram of a reflection interference control apparatus according to a fourth embodiment of the present application.

As shown in FIG. 7, an apparatus 700 according to a fourth embodiment of the present application may further comprise:

a sending module 710, configured to send the control signal after the first control module 420 generates the control signal.

According to different control manners of the control signal and different manners and degrees in which and by which the light source can be controlled, the sending manner of the sending module 710 may also vary. Specifically:

In an example embodiment, the control signal needs to control the light source corresponding to the target reflection interference signal, and in this case, the sending module 710 sends the control signal in such a manner that the light source of the target reflection interference signal can receive the control signal. The sending manner of the sending module 710 may be wired or wireless. The wireless manners comprise WiFi, Bluetooth, and the like, and may also comprise a manner of sending the control signal to the light source of the target reflection interference signal in the form of a light signal along an incident light path of the target reflection interference signal. By still using the scenario shown in FIG. 1 as an example, it is detected that the light signal transmitted by the light source 120 is reflected from the display screen surface at a reflection angle $\alpha$, and the light signal enters the field of view of the user at an incident angle $\beta$. After the two angles are determined, a light path of the light signal transmitted by the light source 120 to the field of view of the user can be determined, and the control signal is returned to the light source 120 along the light path. In this case, the apparatus according to this embodiment of the present application may further comprise a functional module for correspondingly determining a light path.

It should be noted that, the light source of the target reflection interference signal may not be a light source that can implement self control, and in this case, the control signal may be sent to a control device of the light source of the target reflection interference signal. The control device of the light source may also be a part of the apparatus according to the embodiments of the present application.

In another example embodiment, the control signal needs to control the light source of the desired signal, and in this case, the sending module 710 sends the control signal in such a manner that the light source of the desired signal or the control device of the light source of the desired signal can receive the control signal. A specific sending manner is similar to that described above about the target reflection interference signal.

Figure 8:
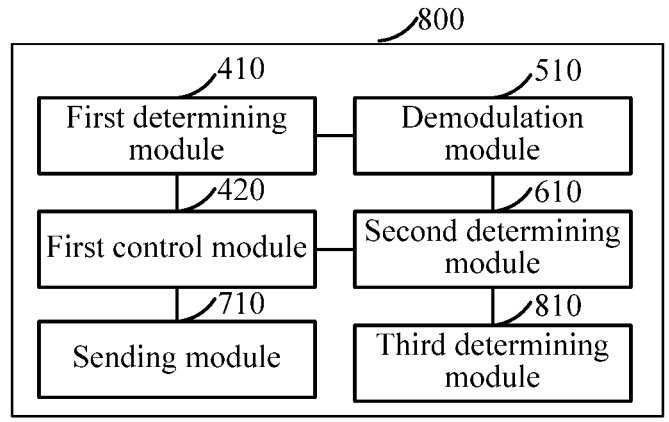
FIG. 8 is an example structural block diagram of a reflection interference control apparatus according to a fifth embodiment of the present application.

In a process of controlling the reflection interference phenomenon, at a moment, the strength of the reflection interference signal is close to the strength of the desired signal (as shown in FIG. 2(*b*)), and it is very difficult for the demodulation module 510 to obtain the identification information comprised in the target reflection interference signal through demodulation. In this case, it may be considered that the strength of the reflection interference signal is approximately equal to the strength of the desired signal. In other words, by increasing the strength of the desired signal and/or decreasing the strength of the target reflection interference signal, the strength of the desired signal and the strength of the target reflection interference signal become closer to each other, and when the strength of the desired signal and the strength of the target reflection interference signal are almost equal, the identifier of the target reflection interference signal cannot be obtained through demodulation. In view of this, as shown in FIG. 8, an apparatus 800 according to a fifth embodiment of the present application may further comprise a third determining module 810.

In the example embodiment in which the second determining module 610 determines light signals corresponding to some identifiers in the at least one preset identifier as target reflection interference signals, the third determining module 810 is configured to determine the strength of the desired signal in response to that the at least one piece of identification information obtained through demodulation by the demodulation module 510 does not comprise an identifier corresponding to the target reflection interference signal. For example, assuming that the detected strength of the light signal from the reflection surface to the field of view of the user is I, the strength of the desired signal is I/2. The strength of the desired signal may be used for further controlling the reflection interference. The strength of the light signal from the reflection surface to the field of view of the user may be detected by a photosensitive element of the apparatus according to the embodiments of the present application or an external photosensitive element.

Alternatively, in the example embodiment in which the second determining module 610 determines light signals corresponding to some identifiers in the at least one preset identifier as target reflection interference signals, in a process in which the first control module 420 controls the reflection interference phenomenon, when the strength of the reflection interference signal is close to the strength of the desired signal at a moment, it is very difficult for the demodulation module 510 to obtain any identification information through demodulation. In view of this, the third determining module 810 is configured to determine the strength of the desired signal in response to that no identification information is obtained through demodulation by the demodulation module 510.

No matter which one of the above example embodiments is used, a manner for determining the strength of the desired signal may be that, for example, assuming that the detected strength of the light signal from the reflection surface to the field of view of the user is I, the strength of the desired signal is I/2. The strength of the desired signal may be used for stopping controlling the reflection interference as described below.

Figure 9:
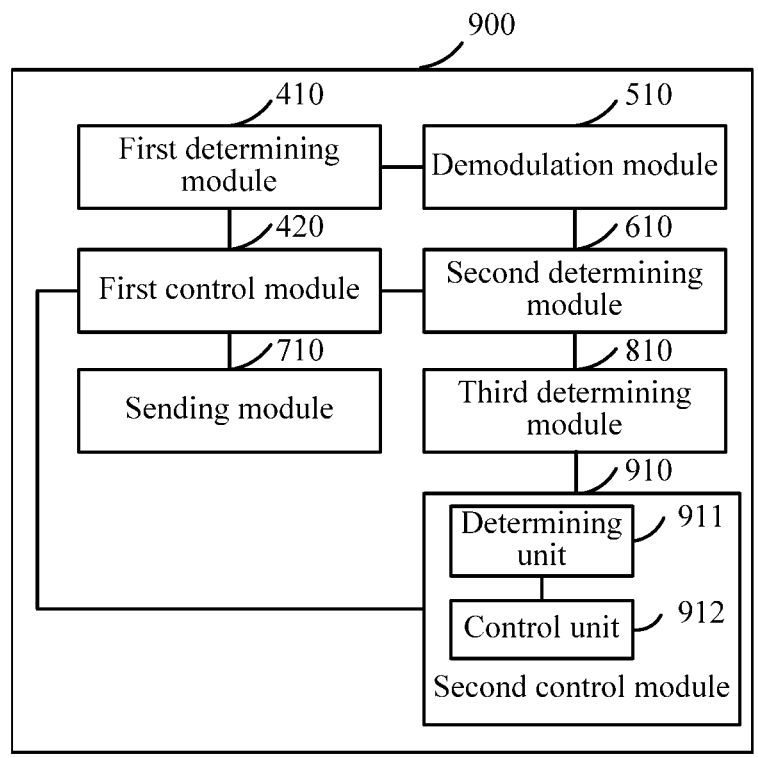
FIG. 9 is an example structural block diagram of a reflection interference control apparatus according to a sixth embodiment of the present application.

Even if the strength of the reflection interference signal is close to the strength of the desired signal, the reflection interference phenomenon still exists, and therefore, after the third determining module 810 determines the strength of the desired signal, the first control module 420 continuously controls the target reflection interference signal. If the strength of the reflection interference signal is obviously smaller than that of the desired signal, no reflection interference phenomenon exists, and the third determining module 810 may not generate the above control signal any longer. In the apparatus according to this embodiment of the present application, whether the third determining module 810 stops generating the control signal is determined according to whether a difference between the strength of the desired signal and the strength of the target reflection interference signal is in a preset range. The preset range may be set according to experience. Correspondingly, as shown in FIG. 9, an apparatus 900 according to a sixth embodiment of the present application may further comprise a second control module 910.

The second control module 910 is configured to: after the third determining module 810 determines the strength of the desired signal, control, in response to that the difference between the strength of the reflection interference signal and the strength of the desired signal is in the preset range, the first control module 420 to stop generating the control signal. The second control module 910 may further comprise a determining unit 911 and a control unit 912.

The determining module 911 is configured to determine the difference according to the strength of the desired signal and current strength of the light signal from the reflection surface to the field of view of the user.

When the at least one piece of identification information does not comprise the identifier corresponding to the target reflection interference signal, reflection interference control is continuously performed, and the difference I-I' may be monitored in real time since then, where I' is the strength, which is acquired at a current moment, of the light signal from the reflection surface to the field of view of the user.

The control unit 912 is configured to stop generating the control signal in response to that the difference is in the preset range. For example, when the difference exceeds a threshold suitable for watching of the user, it indicates that the desired signal is greater than the reflection interference signal by such a degree that the user will not perceive the existence of the reflection interference signal, and in this case, generation of the control signal can be stopped.

To sum up, the apparatus according to this embodiment of the present application can automatically properly adjust the reflection interference phenomenon, so as to provide good user experience.

Figure 10:
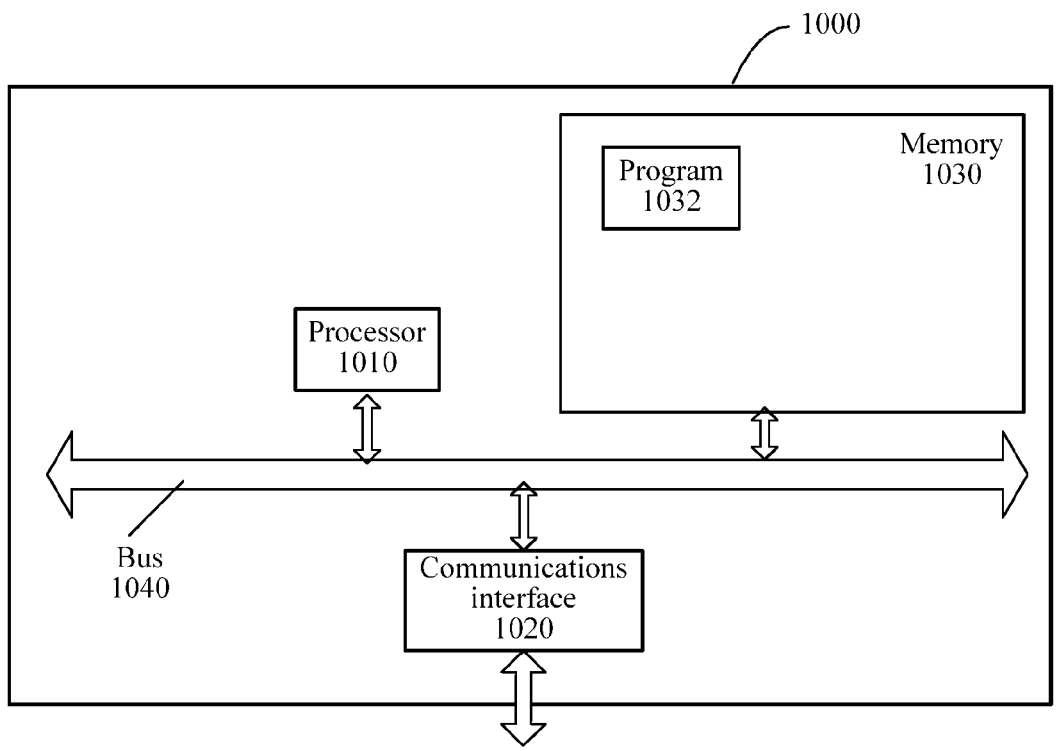
FIG. 10 is an example structural block diagram of a reflection interference control apparatus according to a seventh embodiment of the present application.

FIG. 10 is a structural block diagram of still another reflection interference control apparatus 1000 according to a seventh embodiment of the present application. Specific embodiments of the present application are not intended to limit the specific example embodiment of the reflection interference control apparatus 1000. As shown in FIG. 10, the reflection interference control apparatus 1000 may comprise:

a processor 1010, a communications interface 1020, a memory 1030, and a communications bus 1040.

The processor 1010, the communications interface 1020, and the memory 1030 communicate with each other by using the communications bus 1040.

The communications interface 1020 is configured to communicate with a network element such as a client.

The processor 1010 is configured to execute a program 1032. Specifically, the processor 1010 can perform relevant steps in the foregoing method embodiments.

Specifically, the program 1032 may comprise program code, where the program code comprises a computer operation instruction.

The processor 1010 may be a central processing unit (CPU), an application specific integrated circuit (ASIC), or one or more integrated circuits configured to implement the embodiments of the present application.

The memory 1030 is configured to store the program 1032. The memory 1030 may comprise a high-speed random access memory (RAM memory), and may also comprise a non-volatile memory, such as at least one magnetic disk memory. The program 1032 may be specifically configured to cause the reflection interference control apparatus 1000 to perform the following steps:

determining, according to identification information comprised in a light signal from a reflection surface to a field of view of a user, that a reflection interference phenomenon exists on the reflection surface; and generating a control signal for lowering the level of the reflection interference, wherein the reflection surface is a surface for displaying target content, and the reflection interference phenomenon is that: the light signal from the reflection surface to the field of view of the user comprises a desired signal and a reflection interference signal, wherein the desired signal is a light signal required for displaying the target content, and the reflection interference signal is a light signal that is transmitted by a light source other than a light source of the desired signal and is reflected from the reflection surface to the field of view of the user.

For the example embodiment of the steps in the program 1032, reference may be made to the corresponding descriptions of corresponding steps and units in the foregoing embodiments, which are not described herein again. It may be clearly understood by a person skilled in the art that, for the purpose of convenient and brief description, reference may be made to the description of corresponding procedures in the foregoing method embodiments for detailed working procedures of the foregoing devices and modules, and details are not described herein again.

Figure 11:
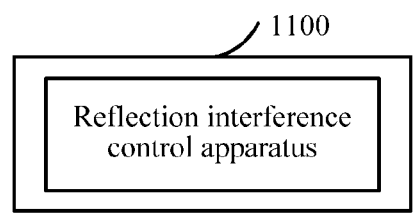
FIG. 11 is an example structural block diagram of a head-mounted device according to an embodiment of the present application.

As shown in FIG. 11, an embodiment of the present application further provides a head-mounted device 1100, comprising the reflection interference control apparatus according to any one of the embodiments shown in FIG. 4 to FIG. 10.

In this embodiment of the present application, the head-mounted device may be, for example, an intelligent glasses (eyeglasses (such as glasses 130 worn by a user in the scenario shown in FIG. 1), or a contact lens), a helmet, goggles, or a headset.

A person of ordinary skill in the art may be aware that, in combination with the examples described in the embodiments disclosed in this specification, units and method steps may be implemented by electronic hardware or a combination of computer software and electronic hardware. Whether the functions are performed by hardware or software depends on particular applications and design constraint conditions of the technical solution. A person skilled in the art may use different methods to implement the described functions for each particular application, but it should not be considered that the implementation goes beyond the scope of the present application.

When the functions are implemented in a form of a software functional unit and sold or used as an independent product, the functions may be stored in a computer-readable storage medium. Based on such an understanding, the technical solutions of the present application essentially, or the part contributing to the prior art, or a part of the technical solutions may be implemented in a form of a software product. The computer software product is stored in a storage medium and comprises several instructions for instructing a computer device (which may be a personal computer, a server, a network device, or the like) to perform all or a part of the steps of the methods described in the embodiments of the present application. The foregoing storage medium comprises: any medium that can store program code, such as a USB flash drive, a removable hard disk, a read-only memory (ROM), a random access memory (RAM), a magnetic disk, or an optical disc.

The foregoing example embodiments are merely used to describe the present application, but are not intended to limit the present application. A person of ordinary skill in the art may further make various variations and modifications without departing from the spirits and scope of the present application. Therefore, all the equivalent technical solutions also fall within the scope of the present application, and the patent protection scope of the present application should be subject to the claims.

What is claimed is:

1. A method, comprising:
   determining, by a system comprising a processor, according to identification information comprised in a light signal from a reflection surface to a field of view of a user, that a reflection interference exists on the reflection surface; and
   generating a control signal for lowering a level of the reflection interference, wherein
   the reflection surface is a surface for displaying target content, and the reflection interference is that: the light signal from the reflection surface to the field of view of the user comprises a desired signal and a reflection interference signal, wherein the desired signal is a first light signal used for displaying the target content, and the reflection interference signal is a second light signal that is transmitted by a first light source other than a second light source of the desired signal and is reflected from the reflection surface to the field of view of the user.

2. The method of claim 1, further comprising:
   demodulating the light signal from the reflection surface to the field of view of the user.

3. The method of claim 2, wherein in the demodulating the light signal from the reflection surface to the field of view of the user,
   at least one piece of identification information is obtained through demodulation, and
   wherein the determining that the reflection interference exists on the reflection surface comprises:
   determining, according to the at least one piece of identification information, that the reflection interference exists on the reflection surface.

4. The method of claim 3, wherein the determining, according to the at least one piece of identification information, that the reflection interference exists on the reflection surface comprises:
   determining, in response to that the at least one piece of identification information comprises at least one preset identifier, that the reflection interference exists on the reflection surface.

5. The method of claim 4, further comprising:
   determining another light signal corresponding to at least one of the at least one preset identifier as a target reflection interference signal.

6. The method of claim 5, wherein the determining the other light signal corresponding to at least one of the at least one preset identifier as a target reflection interference signal comprises:
   determining all light signals corresponding to the at least one preset identifier as target reflection interference signals.

7. The method of claim 5, wherein the generating the control signal for lowering the level of the reflection interference comprises:
   generating the control signal that is used for lowering the level of the reflection interference by increasing the luminance of the second light source of the desired signal or decreasing the luminance of a third light source corresponding to the target reflection interference signal.

8. The method of claim 7, further comprising:
   sending the control signal.

9. The method of claim 8, wherein the sending the control signal comprises:
   sending the control signal in such a manner that the third light source corresponding to the target reflection interference signal or a control device of the third light source corresponding to the target reflection interference signal is enabled to receive the control signal.

10. The method of claim 8, wherein the sending the control signal comprises:
    sending the control signal in such a manner that the second light source of the desired signal or a control device of the second light source of the desired signal is enabled to receive the control signal.

11. The method of claim 8, further comprising:
    determining a strength of the desired signal in response to determining that the at least one piece of identification information does not comprise an identifier corresponding to the target reflection interference signal.

12. The method of claim 11, wherein the strength of the desired signal is half of the strength of the light signal from the reflection surface to the field of view of the user.

13. The method of claim 12, wherein after the determining the strength of the desired signal, the method further comprises:
stopping the generating the control signal in response to determining that a difference between the strength of the desired signal and another strength of the reflection interference signal is in a preset range.

14. The method of claim 13, wherein the stopping the generating of the control signal in response to determining that the difference between the strength of the desired signal and the other strength of the reflection interference signal is in the preset range comprises:
determining the difference according to the strength of the desired signal and a current strength of the light signal from the reflection surface to the field of view of the user; and
stopping generating the control signal in response to determining that the difference is in the preset range.

15. The method of claim 8, wherein, after the sending the control signal, in the demodulating the light signal from the reflection surface to the field of view of the user,
no identification information is obtained through demodulation; and
the method further comprises:
determining a strength of the desired signal in response to determining that no identification information is obtained through the demodulation.

16. The method of claim 5, wherein the generating the control signal for lowering the level of the reflection interference comprises:
generating the control signal that is used for lowering the level of the reflection interference by adjusting an orientation of a third light source corresponding to the target reflection interference signal.

17. The method of claim 3, wherein the determining, according to the at least one piece of identification information, that the reflection interference exists on the reflection surface comprises:
determining, in response to that the at least one piece of identification information comprises at least one identifier other than a preset identifier, that the reflection interference exists on the reflection surface.

18. The method of claim 17, further comprising:
determining another light signal corresponding to at least one of the at least one identifier other than the preset identifier as a target reflection interference signal.

19. The method of claim 18, wherein the determining the other light signal corresponding to at least one of the at least one identifier other than the preset identifier as a target reflection interference signal comprises:
determining all light signals corresponding to the at least one identifier other than the preset identifier as target reflection interference signals.

20. An apparatus, comprising:
a memory that stores executable modules; and
a processor, coupled to the memory, that executes or facilitates execution of the executable modules, comprising:
a first determining module configured to determine, according to identification information comprised in a light signal from a reflection surface to a field of view of a user, that a reflection interference phenomenon exists on the reflection surface; and
a first control module configured to generate a control signal for lowering a level of the reflection interference phenomenon, wherein
the reflection surface is a surface for displaying target content, and the reflection interference phenomenon is that: the light signal from the reflection surface to the field of view of the user comprises a desired signal and a reflection interference signal, wherein the desired signal is a first light signal required for displaying the target content, and the reflection interference signal is a second light signal that is transmitted by a first light source other than a second light source of the desired signal and is reflected from the reflection surface to the field of view of the user.

21. The apparatus of claim 20, wherein the executable modules further comprise:
a demodulation module configured to demodulate the light signal from the reflection surface to the field of view of the user.

22. The apparatus of claim 21, wherein the first determining module is configured to determine, according to at least one piece of identification information obtained through demodulation by the demodulation module, that the reflection interference phenomenon exists on the reflection surface.

23. The apparatus of claim 22, wherein the first determining module is configured to determine, in response to determining that the at least one piece of identification information comprises at least one preset identifier, that the reflection interference phenomenon exists on the reflection surface.

24. The apparatus of claim 23, wherein the executable modules further comprise:
a second determining module configured to determine another light signal corresponding to at least one of the at least one preset identifier as a target reflection interference signal.

25. The apparatus of claim 24, wherein the second determining module is configured to determine all light signals corresponding to the at least one preset identifier as target reflection interference signals.

26. The apparatus of claim 24, wherein the first control module is configured to generate the control signal that is used for lowering the level of the reflection interference by increasing the luminance of the second light source of the desired signal or decreasing the luminance of a third light source corresponding to the target reflection interference signal.

27. The apparatus of any one of claim 26, wherein the executable modules further comprise:
a sending module configured to send the control signal.

28. The apparatus of claim 27, wherein the sending module is configured to send the control signal in such a manner that the third light source corresponding to the target reflection interference signal or a control device of the light source corresponding to the target reflection interference signal are able to receive the control signal.

29. The apparatus of claim 27, wherein the sending module is configured to send the control signal in such a manner that the second light source corresponding to the desired signal or a control device of the second light source corresponding to the desired signal are able to receive the control signal.

30. The apparatus of claim 27, wherein the executable modules further comprise:

a third determining module configured to determine a first strength of the desired signal in response to determining that the at least one piece of identification information obtained through demodulation by the demodulation module does not comprise an identifier corresponding to the target reflection interference signal.

31. The apparatus of claim 30, wherein the second determining module determines that the first strength of the desired signal is half of a second strength of the light signal from the reflection surface to the field of view of the user.

32. The apparatus of claim 31, wherein the executable modules further comprise:
a second control module configured to control, in response to determining that a difference between the first strength of the desired signal and the second strength of the reflection interference signal is in a preset range, the first control module to stop the generating of the control signal.

33. The apparatus of claim 32, wherein the second control module comprises:
a determining unit configured to determine the difference according to the first strength of the desired signal and a current strength of the light signal from the reflection surface to the field of view of the user; and
a control unit configured to stop the generating of the control signal in response to determining that the difference is in the preset range.

34. The apparatus of claim 27, wherein the executable modules further comprise:
a third determining module configured to determine a first strength of the desired signal in response to that no identification information is obtained through demodulation by the demodulation module.

35. The apparatus of claim 24, wherein the first control module is configured to generate the control signal that is used for lowering the level of the reflection interference by adjusting an orientation of a third light source corresponding to the target reflection interference signal.

36. The apparatus of claim 22, wherein the first determining module is configured to determine, in response to determining that the at least one piece of identification information comprises at least one identifier other than a preset identifier, that the reflection interference phenomenon exists on the reflection surface.

37. The apparatus of claim 36, wherein the executable modules further comprise:
a second determining module configured to determine another light signal corresponding to at least one of the at least one identifier other than the preset identifier as a target reflection interference signal.

38. The apparatus of claim 37, wherein the second determining module is configured to determine all light signals corresponding to the at least one identifier other than the preset identifier as target reflection interference signals.

39. A head-mounted device, wherein the head-mounted device comprises the apparatus of claim 20.

40. A computer readable storage device, comprising at least one executable instruction, which, in response to execution, causes a system comprising a processor to perform operations, comprising:
determining, according to identification information comprised in a light signal from a reflection surface to a field of view of a user, that a reflection interference phenomenon exists on the reflection surface; and
generating a control signal for lowering a level of the reflection interference phenomenon, wherein
the reflection surface is a surface for displaying target content, and the reflection interference phenomenon is that: the light signal from the reflection surface to the field of view of the user comprises a desired signal and a reflection interference signal, wherein the desired signal is a first light signal required for displaying the target content, and the reflection interference signal is a second light signal that is transmitted by a first light source other than a second light source of the desired signal and is reflected from the reflection surface to the field of view of the user.

41. A device for reflection interference control, comprising a processor and a memory, wherein the memory storing a computer executable instruction, the processor being connected with the memory via a communication bus, and when the device is operating, the processor executes or facilitates execution of the executable instructions stored by the memory to cause the device to perform operations, comprising:
determining, according to identification information comprised in a light signal from a reflection surface to a field of view of a user, that a reflection interference phenomenon exists on the reflection surface; and
generating a control signal for lowering a level of the reflection interference phenomenon, wherein
the reflection surface is a surface for displaying target content, and the reflection interference phenomenon is that: the light signal from the reflection surface to the field of view of the user comprises a desired signal and a reflection interference signal, wherein the desired signal is a first light signal required for displaying the target content, and the reflection interference signal is a second light signal that is transmitted by a light source other than another light source of the desired signal and is reflected from the reflection surface to the field of view of the user.

* * * * *